UNITED STATES PATENT OFFICE.

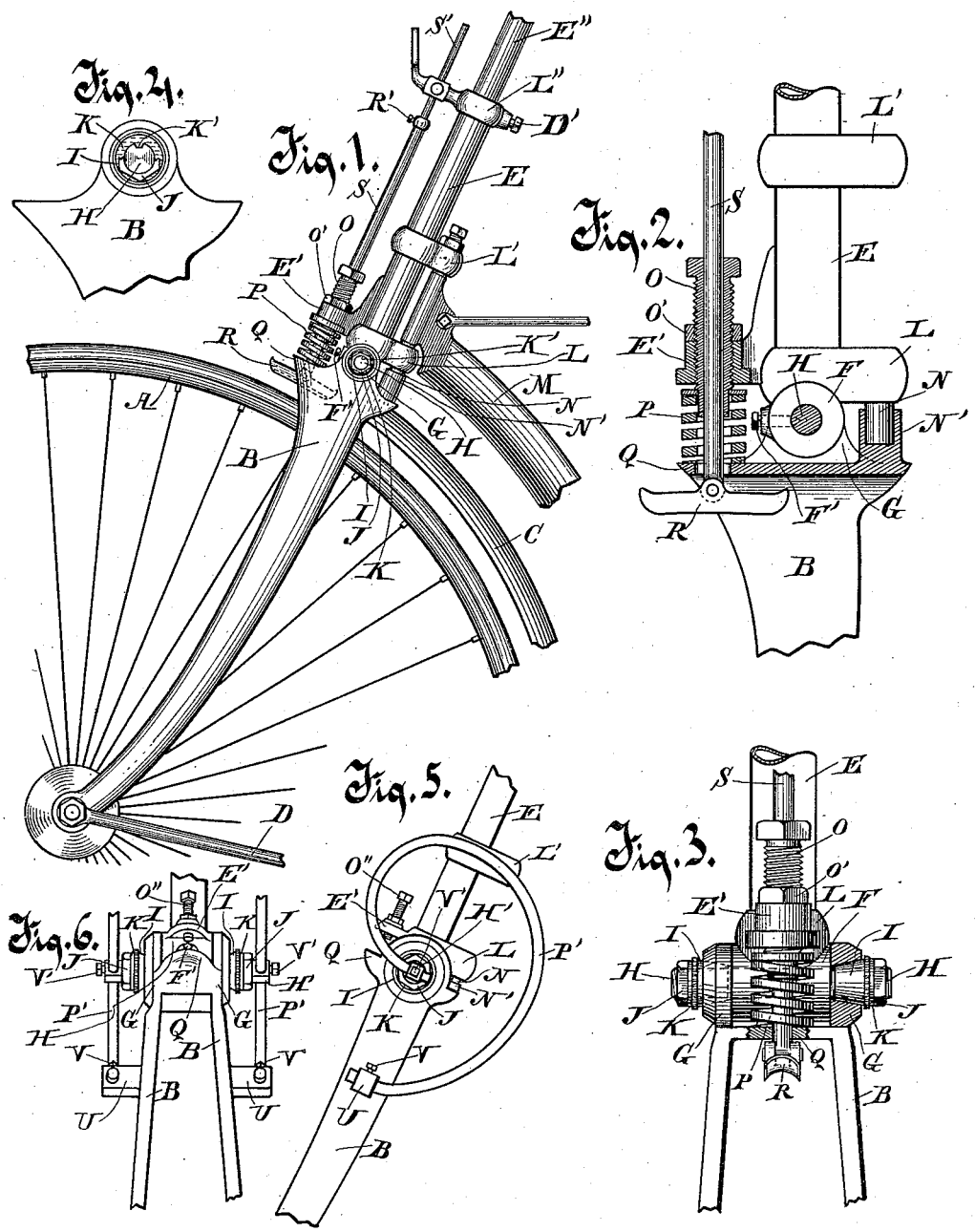

VAN ZANDT MUMFORD MOORE, OF MILWAUKEE, WISCONSIN.

BICYCLE.

SPECIFICATION forming part of Letters Patent No. 447,341, dated March 3, 1891.

Application filed September 29, 1890. Serial No. 366,462. (No model.)

*To all whom it may concern:*

Be it known that I, VAN ZANDT MUMFORD MOORE, of Milwaukee, in the county of Milwaukee and State of Wisconsin, have invented a new and useful Improvement in Bicycles, of which the following is a description, reference being had to the accompanying drawings, which are a part of this specification.

My invention relates particularly to the construction and arrangement of the fork and the parts of the bicycle supported directly thereon and having mechanical relation directly thereto.

The novel features of my improved device will be hereinafter specifically claimed.

In the drawings, Figure 1 is a fragment of the front wheel of a Safety bicycle with my improved fork and improved superposed parts in connection therewith, showing the construction of the parts and their relations to each other. Fig. 2 is a central vertical section of the top of the fork and the devices for connecting the head thereto and supporting it yieldingly thereon with the head in outline in its proper relation to the fork. Fig. 3 is a front view of the top portion of the fork and of parts of the superposed mechanism. Fig. 4 is a detail. Figs. 5 and 6 are a side and front view, respectively, of a modified form of my improved device.

A is the front wheel of a bicycle of that class known as "Safety bicycles," in which the two wheels are of equal or nearly equal diameter.

B is the fork, in the lower ends of which the axle of the wheel has its bearings, the fork being supported on the axle.

C is a mud-guard, the front end of which is secured to the top of the fork and the rear lower end of which is made fast to braces D, pivoted at their front ends on the axle of the wheel.

In my improved device the fork B is made complete in a single integral metal piece the legs of which are straight or slightly curved and are parallel to and opposite each other laterally. A part called the "head," consisting, principally, of a tubular head E, is hinged at its lower end to the top of the fork B, conveniently, by an enlarged bearing part F, fitted between ears G G integral with the fork B and hinged thereto by the pivot-bolt H passing therethrough. This joint provides for and permits a front and rear movement of the head E on the fork B. Conical nut-bearings I I, turning by screw-thread on the bolt H, bear against the ears G G in beveled apertures therefor and are adapted for taking up the wear of the parts. The jam-nuts J J on the bolt H bear against the washers K K, interposed between them and the nut-bearings I. The washers K are provided with a tongue K', adapted to enter a corresponding groove in the bolt H and prevent their rotation thereon. The bolt H is secured rigidly to the bearing F by a set-screw F', turning through the bearing against the bolt. The lugs L and L', secured rigidly to the head E at a distance apart, form bearings in which the front end of the backbone M is pivoted so as to have a lateral swinging motion therein. The particular means and method of connecting the backbone to the head is not material, as it forms no part of my invention, and any other form of construction for this purpose could be adopted without reference to the novel features of my device. To limit the hinge movement of the head E and fork B on each other, a rubber block N, set in a stud N', rigid on the fork, serves as a stop to receive thereon the thrust and bearing of the lug L on the head E. In front of the head E and diametrically opposite the block N a bracket E', rigid on the head E, is provided with a hollow screw-threaded bolt O, turning therein toward a ledge Q, formed on the fork B. A coiled spring P, resting on the ledge Q and bearing at the other end against a shoulder on the bolt O, is adapted to limit and control yieldingly the movement of the head E and fork B forwardly toward each other. The amount of this movement is adjusted and regulated by the sleeve-bolt O, turning in the bracket E' toward or from the ledge Q. A jam-nut O', turning on the bolt O against the bracket E', serves to lock the bolt in position in the bracket. When desired, the bolt O may be so far turned down as to compress the spring P unyieldingly together, thus forming a rigid connection between the head E and fork B; or, if desired for a temporary purpose, the spring P may be removed and the bolt O may be turned down tightly against the ledge Q, thus securing the same result.

A brake-shoe R is hinged on the lower extremity of a brake-rod S, which passes movably through the ledge Q, the spring P, and a sleeve-bolt O. This rod S is also hollow and receives movably therein the rod S', forming a continuation of the brake-rod and adjustable in the rod or tube S by means of the set-screw R'. The brake-shoe R is adapted to be forced against or removed from the surface of the wheel by the endwise movement of the rod S in its bearings. The rod S' passes movably through the lug L'', rigid on the head E. The handle-post E''is movable endwise in the tubular head E and is secured adjustably therein by the set-screw D'.

In the modified form of device shown in Figs. 5 and 6 the coiled spring P of Figs. 1, 2, and 3 is omitted, and instead thereof, and to perform the same function, curved springs P' P' are used. The upper ends of these springs are inserted in the projecting ends of the pivoted bolt H', and the other extremities of the springs are fixed in lugs U U, rigid on the legs of the fork. Set-screws V V turn in the lugs U U against the ends of the springs to hold them in place. In this form of device a set-screw O'', turning through the bracket E' to or nearly to the ledge Q, serves to limit or prevent the movement of the head E and fork R toward each other forwardly. Set-screws V' V', turning in the bolt H' against the springs P' P', secure them in position in the bolt.

What I claim as new, and desire to secure by Letters Patent, is—

1. In a bicycle, the combination, with the wheel and an integral two-legged fork having no joints in its legs, of a handle-post-supporting head supported on the fork and hinged thereto beyond the periphery of the wheel in the substantially straight axial line of the fork and head, and a backbone pivoted to the handle-post-supporting head, above its junction with the fork, substantially as described.

2. In a bicycle, the combination, with a wheel and an integral two-legged fork having no joints in its legs, of a handle-post-supporting-head supported on the fork and hinged thereto beyond the periphery of the wheel in the substantially straight axial line of the fork and head, independent and separable bearings at the rear of the junction of the head on the fork, whereby the fork and head normally held in line by the bearings are allowed a hinge movement on each other, and a backbone pivoted to the handle-post-supporting head above its junction with the fork, substantially as described.

3. In a bicycle, the combination, with an integral wheel-straddling fork and a handle-post-supporting head hinged thereto by a pivot in the continuous straight axial line of the fork and head and a backbone pivoted to the head of bearings on the fork and the head at the rear of their joint, and a spring in front of the joint interposed between projections on the head and on the fork, whereby the forward movement of the head and fork toward each other is limited and modified, substantially as described.

4. In a bicycle, the combination, with an integral wheel-straddling fork and a handle-post-supporting head jointed to the united upper end of the fork beyond the periphery of the wheel, the fork and head having a continuous substantially straight axial line in which the pivot is located, and a backbone pivoted on the head, of projections from the fork and the head bearing against each other at the rear of the joint, and projections from the head and the fork toward the front, and a spring interposed between the front projections, all these projections and the spring being located beyond the periphery of the wheel, substantially as described.

5. In a bicycle, the combination, with a wheel-supported fork and a backbone-supporting head pivoted on the fork, of substantially unyielding bearings on the fork and the head opposite each other at the rear of the head and fork joint, and an adjustable bearing at the front of the head and fork joint between a bracket and ledge on the head and fork, respectively, whereby the forward movements of the extremities of the head and fork toward each other are limited or prevented, substantially as described.

6. In a bicycle, the combination, with a wheel-supported fork and a thereon-hinged post-carrying head, of a brake-shoe, a thereto-connected brake-rod, and lugs or brackets on the head in which the brake-rod is movable endwise, the brake-shoe being in such construction arranged to bear on the wheel at or near the top of the fork, substantially as described.

7. In a bicycle, the combination, with a wheel-straddling fork and a post-supporting head pivoted together, of a ledge projecting from the fork near its jointed end, a bracket projecting from the head opposite the ledge on the fork, a hollow bolt having a shoulder and turning by screw-thread through the bracket toward the ledge, and a spring interposed between the ledge and the bracket and bearing at one end on the ledge and at the other end against the shoulder on the bolt, whereby it is capable of adjustment, substantially as described.

8. In a bicycle, the combination, with a wheel-straddling fork and a post-supporting head pivoted thereto in a substantially straight axial line, of substantially unyielding bearings on the fork and the head at the rear of their joint, a spring interposed between projections on the fork and on the head in front of their joint, and an adjusting-screw turning through the projection on the head against the spring, whereby its tension is regulated, substantially as described.

In testimony whereof I affix my signature in presence of two witnesses.

VAN ZANDT MUMFORD MOORE.

Witnesses:
C. T. BENEDICT,
C. H. KEENEY.